United States Patent [19]

Baas

[11] 4,313,592

[45] Feb. 2, 1982

[54] BUTTERFLY VALVE

[75] Inventor: Hendrik B. Baas, Halsteren, Netherlands

[73] Assignee: Holland Bergen op Zoom B.V. Machinefabriek en/IJzergieterij, Bergen op Zoom, Netherlands

[21] Appl. No.: 209,061

[22] Filed: Nov. 21, 1980

Related U.S. Application Data

[63] Continuation of Ser. No. 55,641, Jul. 9, 1979, abandoned.

[51] Int. Cl.³ .............................................. F16K 25/00
[52] U.S. Cl. ...................................... 251/162; 251/58; 251/228; 251/248; 251/305
[58] Field of Search ................. 251/161, 162, 163, 58, 251/228, 248, 298, 305, 306

[56] References Cited

U.S. PATENT DOCUMENTS

| | | | |
|---|---|---|---|
| 1,740,041 | 12/1929 | Schmidt | 251/162 |
| 2,811,981 | 11/1957 | Harris | 251/161 |
| 2,833,511 | 5/1958 | Fletcher | 251/218 |
| 2,934,310 | 4/1960 | Kinney et al. | 251/163 |
| 3,272,223 | 9/1966 | Sass | 251/161 |
| 3,776,505 | 12/1973 | Nakanishi | 251/163 |
| 3,931,955 | 1/1976 | Jacobs | 251/305 |

FOREIGN PATENT DOCUMENTS 2250414  5/1975  France ................... 251/161

Primary Examiner—H. Jay Spiegel
Attorney, Agent, or Firm—John P. Snyder

[57] ABSTRACT

A butterfly valve includes an annular valve seat and a disc-like valve member mounted both for rotation about an axis parallel to the valve seat and for axial displacement relative to the seat. The actuating mechanism automatically effects sequential motion of the valve member, first to rotate it to closed position and to shift it into sealed engagement against the valve seat, and vice versa, and includes structure which self-locks in the latter position.

16 Claims, 4 Drawing Figures

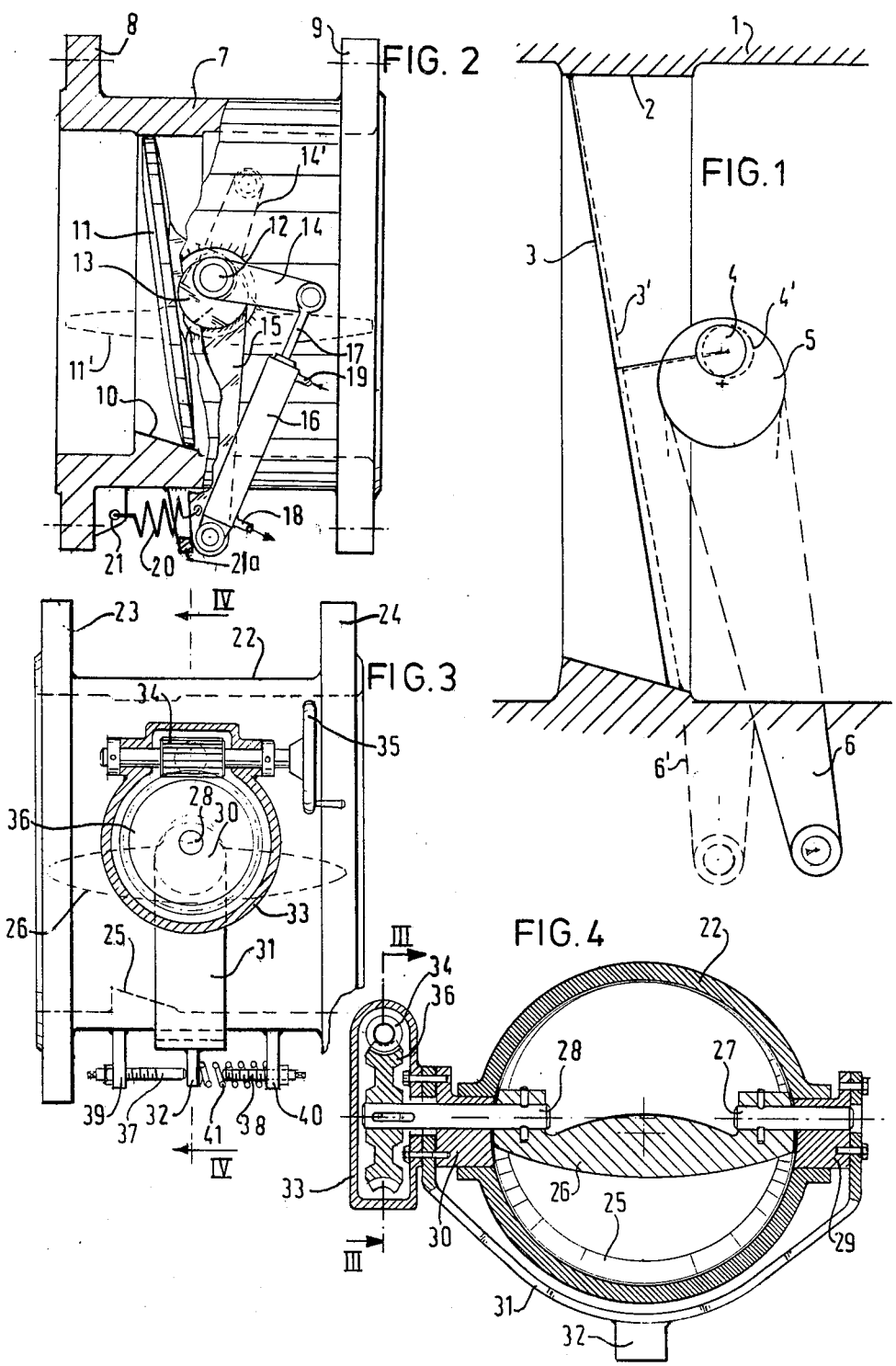

BUTTERFLY VALVE

The above-entitled application is a continuation of application, Ser. No. 055,641 filed July 9, 1979 and now abandoned.

The invention relates to a butterfly valve comprising a substantially cylindrical housing with a seat and a valve member supported rotatably in the housing and cooperating with said seat, said valve member being provided with actuating means lying outside the housing, the spindle of the valve member being supported eccentrically in sleeves which are rotatably mounted in the housing, said sleeves being provided with actuating means lying outside the housing, such that upon a rotational movement of the sleeves the spindle of the valve will be displaced in a direction perpendicular or substantially perpendicular to the plane of the seat.

In such an embodiment of a butterfly valve first the valve member is brought in the position in which the valve member is closed. Then by rotating the bearing sleeves the valve member is pressed onto the seat in the right position with a strong pressure. In rotating the valve member there is no friction resistance to overcome as a result of the movement of the sealing edge along the seat.

It is an object of the invention to provide a valve which in the closed position of the valve member is automatically locked.

According to the invention the eccentric bearing of the spindle of the valve is self-locking such that under the influence of the forces acting inside the housing the valve member or the bearing sleeves will not be rotated. So, the valve member is automatically locked without the necessity to lock the actuating means of the valve from the outside.

According to the invention the actuating means of the valve member and the actuating means of the bearing sleeves can be connected by a common actuating device and the reaction force created upon actuating the valve member is produced by the actuating member connected with the bearing sleeves, so that the bearing sleeves will be rotated under influence of the reaction force, when this force in the closed position of the valve member increases and passes a well defined value. One has then one single actuating device. First the actuating device is used for bringing the valve member in the closed position and when in the closed position the reaction force passes a defined value, the actuating device will also rotate the bearing sleeves so that the valve member is pressed home on its seat.

According to the invention the valve member in the closed position can engage a stop in order to let increase the reaction force.

In an advantageous embodiment of a butterfly valve the seat of the valve has a seating surface defining a section of an oblique cone having its apex lying in the wall of the cylindrical housing, a section of the cone perpendicular to the axis of the housing being in the shape of a circle and the rotating axis of the valve member lying excentrically in relation to the axis of the cylindrical housing and lying displaced in axial direction in relation to the plane of the sealing edge of the valve member.

In such an embodiment of a butterfly valve it is under normal circumstances possible by increasing the rotating force on the spindle of the valve member to increase the pressure of the valve member on the sealing edge of the seat so that one has a better sealing. Then however, it is necessary that the edge of the valve member is of elastic material. This again has the disadvantage that the embodiment can only be used when the working conditions are such that the elastic material maintains its elasticity.

When non-elastic material for the sealing edges were used, such an embodiment would be only possible when the parts of the valve would be machined in ideal way and there would be an exact fit which would be maintained in difficult working conditions such as big temperature differences.

According to the invention it is possible to have an embodiment of such a valve with sealing edges of the valve member and of the seat of a stiff material, more especially metal or plastic. Then the sealing effect needs not to be obtained by increasing the force on the spindle of the valve member but by displacing the spindle of the valve member in the closed position in the direction of the seat.

In an advantageous embodiment according to the invention the actuating member of the bearing sleeves can be biassed by a spring for rotating the bearing sleeves in the direction in which the valve member is removed from its seat. Then the valve member automatically is released from its seat when the actuating device is actuated in opposite direction.

According to the invention the actuating device for the valve member and for the bearing sleeves can consist of a cylinder and a piston, one of which is connected with the actuating member of the valve member and the other of which is connected with the actuating member of the bearing sleeves, said cylinder having connections for supplying a pressure fluid on either side of the piston. By supplying pressure fluid on one side of the piston the valve member can be closed and be pressed onto the seat and by supplying the pressure fluid on the other side of the piston the valve member can be released from its seat.

The invention will be elucidated in the following description of some embodiments shown in the drawing In the drawing shows:

FIG. 1 schematically a section of a valve,

FIG. 2 an embodiment of a valve partly in section and partly in side view,

FIG. 3 a valve according to the invention in another embodiment in a side view and partly in section, FIG. 4 a section according to the line IV—IV from FIG. 3.

FIG. 1 shows in section a valve according to the invention. The housing 1 has a seat 2, the seating surface of which is part of a cone, the apex of the cone lying in the wall of the housing 1 and a section perpendicular to the axis of the housing has the shape of a circle. With the seat 2 cooperates a valve member 3 which is mounted on a spindle 4 which is eccentrically rotatably supported in a sleeve 5 which is supported in the wall of the housing 1. The spindle 4 lies with its axis eccentrically in relation to the axis of the housing 1 and the spindle 4 also is displaced in relation to the plane of the valve member 3. The sleeve 5 can be rotated by means of an arm 6. The actuating device of the spindle 4 is not shown. When the valve is in the fully open position, the spindle 4 is located as indicated with the dotted line 4'. The sleeve 5 is then rotated and the arm 6 is in the position 6'. When then the spindle 4 is rotated the valve 3 is brought in the position 3' and contacts then the seat 2 in the housing 1. The spindle 4 can not be rotated further without applying extremely strong forces. When the seat 2 is of stiff material and the same is true for the edge of the valve 3, the valve can not be rotated further than the position 3'. When the arm 6' is brought in the position 6 then owing to the eccentric bearing of the spindle 4 in the sleeve 5, the spindle 4 will be displaced in substantially axial direction of the housing so that the valve member from the position 3' is brought in the position 3. This displacement can be done with a strong force and one has a very good seating of the valve member 3 in the housing. In the drawing the dimensions are not exact because the drawing is only meant for a schematic elucidation. FIG. 2 shows a housing 7 with flanges 8 and 9 to mount the housing 7 in a pipeline. The housing 7 has a seat corresponding with the seat 2 from FIG. 1. With this seat cooperates a valve member 11 which is supported with its spindle 12 in the sleeve 13. The bearing in the sleeve 13 is also eccentric. The spindle 12 has an actuating arm 14 whereas the sleeve 13 has an actuating arm 15. With the actuating arm 15 is rotatably connected a cylinder 16 whereas the piston rod 17 of the piston which can move in the cylinder 16, is connected with the arm 14. Through the connections 18 and 19 a pressure fluid can be supplied to the cylinder 16 on an opposite side of the piston. The arm 15 is biassed by a draw spring 20 against a stop 21a, the spring 20 is with its one end attached to the arm 15 and with its other end at 21 to the housing 7.

In the open position the valve member is in the position 11' and the arm 14 is in the position 14'. When pressure fluid is supplied through the connection 19, the arm 14 will be swung to the right so that the valve member 11' is brought in the position 11. The valve member 11 then touches the seat 10. The spring 20 is dimensioned in such a way that the reaction force upon the rotation of the valve member 11 is not sufficient to overcome the force exerted by the spring 20 on the arm 15. So the arm 15 will not swing and the sleeve 13 remains in the position as shown in the drawing. When however, the valve member 11 contacts the seat 10, the reaction force which has to be supplied by the cylinder 16 will increase and the force of the spring 20 now can be overcome so that the arm 15 is swung to the right and the valve member 11 is pressed onto its seat 10. When then again pressure fluid is supplied through the connection 18 the spring 20 will bring the arm 15 back in the drawn position and the valve member 11 is released from its seat and after that the valve member can be rotated into the position 11'.

The FIGS. 3 and 4 again show a housing 22 with flanges 23 and 24. The housing has a seat 25 and a valve member 26 cooperating with said seat. The valve member 26 has spindle parts 27 and 28 which are supported eccentrically in respective sleeves 29 and 30 which sleeves are rotatably supported in the housing 22. The sleeves 29 and 30 are connected by a bracket 31 which has a stop portion 32. On the sleeve 30 is mounted a housing 33 of a worm gearing. The worm 34 can be driven by means of a hand-wheel 35 and the toothwheel 36 is mounted on the spindle part 28. The stop portion 32 can perform a limited movement between two bolts 37 and 38. These bolts are mounted in portions 39 and 40 connected to the housing of the valve. The stop portion 32 and so the bracket 31 is biassed by a pressure spring 41. In the position shown in the drawing the valve is open. By means of the handwheel 35 the worm gear transmission can be actuated so that the valve member can be rotated into the closed position in which the valve member 26 cooperates with the seat 25. In this position of the valve member the reaction force which is supplied by the housing of the transmission will increase and the pressure of the spring 41 will be overcome so that the bracket 31 is swung and the valve is pressed with a large force onto the seat 25. The eccentricity of the spindles of the valve and the lengths of the lever arms are in both embodiments such that a force working on the valve member will not rotate the bearing sleeve. So, it is not necessary to take special steps to lock the valve in the closed position. This locking of the valve is obtained automatically.

What I claim is:

1. A butterfly valve assembly comprising, in combination:
   a substantially cylindrical housing having an annular valve seat therein;
   a disc-like valve member having spindle means mounting said valve member for rotational movement about an axis transverse to said housing and said valve member being dimensioned to engage around its periphery, when rotated about said axis, with said valve seat;
   first actuating means for rotating said valve member in one direction about said axis between a fully open position and a closed position in which said valve member is engaged with and forced with predetermined pressure against said seat;
   self-locking means for shifting said spindle means substantially axially of said housing to engage said valve member against said seat with a pressure exceeding said predetermined pressure and sufficient to lock said self-locking means;
   second actuating means swingable in that direction opposite said one direction for actuating said self-locking means to shift said spindle means; and
   a common actuator interconnecting said first and second actuating means.

2. A butterfly assembly as defined in claim 1 wherein said self-locking means comprises eccentric bearings mounting said spindle means in said housing.

3. A butterfly assembly as defined in claim 1 or 2 including biassing means for normally urging said second actuating means in said one direction.

4. A butterfly valve assembly as defined in claim 3 including a stop limiting the motion of said second actuating means in said one direction.

5. A butterfly assembly as defined in claim 3 wherein said biassing means comprises a spring which establishes said predetermined pressure.

6. A butterfly assembly as defined in claim 4 wherein said biassing means comprises a spring which establishes said predetermined pressure.

7. A butterfly assembly as defined in claim 1 or 2 wherein said seat defines a seating surface defining a section of an oblique cone having its apex lying in the wall of the cylindrical housing, a section of the cone perpendicular to the axis of the housing being in the shape of a circle and the rotating axis of the valve member lying eccentrically in relation to the axis of the cylindrical housing and lying displaced in axial direction in relation to the plane of the sealing edge of the valve member wherein the sealing edge of the valve member and the sealing edge of the seat consist of a stiff material.

8. A butterfly assembly as defined in claim 7 including biassing means for normally urging said second actuating means in said one direction.

9. A butterfly assembly as defined in claim 8 including a stop limiting the motion of said second actuating means in said one direction.

10. A butterfly assembly as defined in claim 9 wherein said biassing means comprises a spring which establishes said predetermined pressure.

11. A butterfly assembly as defined in claim 8 wherein said biassing means comprises a spring which establishes said predetermined pressure.

12. A butterfly assembly as defined in claim 7 wherein said common actuator comprises a gear housing having an input gear journalled therein and an output gear, engaging said input gear, and connected with said spindle means, said second actuating means being connected to said gear housing.

13. A butterfly assembly as defined in claim 7 wherein said common actuator comprises a piston and a cylinder, one of which is connected with said first actuating means and the other of which is connected with said second actuating means.

14. A butterfly valve comprising a housing having an annular, inwardly facing conical valve seat surface which defines a flow passage centered about a longitudinal axis, a valve member having an annular, outwardly facing valve surface and including spindle means journalling said valve member about a first axis which is longitudinally offset with respect to said valve surface and is normal to a plane containing said longitudinal axis but in laterally offset relation to said longitudinal axis whereby said valve member when rotated about said first axis is moved from a fully open position essentially parallel to said longitudinal axis toward a fully closed position in which said valve surface is in face-to-face sealing contact with said valve seat surface, the improvement which comprises:

eccentric bushing means rotatably journalled in said housing about a second axis parallel to said first axis and contained in a plane, also containing said first axis, which is essentially normal to said longitudinal axis whereby slight rotation of said bushing means from an initial to a final position thereof shifts said first axis along an arc, determined by the offset between said first and second axes, toward said valve seat surface; and actuator means for initially rotating said valve member about said first axis substantially to said fully closed position thereof while maintaining said bushing means in said initial position thereof and then rotating said bushing means from said initial position to said final position thereof while continuing to urge said valve member about said first axis, whereby the combined effect of the shifting of said first axis toward said valve seat surface and the continued rotation of the valve member about said first axis forces said valve member into said fully closed position thereof while self-locking said bushing means in said final position thereof.

15. A butterfly valve as defined in claim 14 wherein said actuator means simultaneously urges said spindle means and said bushing rotatably about their respective axes and includes biassing means resiliently opposing such rotation of said bushing.

16. A butterfly valve as defined in claim 14 including a stop limiting the motion of said valve member about said first axis.

* * * * *